(12) United States Patent
Manninen (10) Patent No.: US 9,358,752 B2
(45) Date of Patent: Jun. 7, 2016

(54) IN-LINE SHEAR RESISTANT NONWOVEN TEXTILES COMPRISED OF SELECTIVELY SLIT AND EMBOSSED FILM

(71) Applicant: ASTENJOHNSON, INC., Charleston, SC (US)

(72) Inventor: Allan R. Manninen, Stittsville (CA)

(73) Assignee: ASTENJOHNSON, INC., Charleston, SC (US)

( * ) Notice: Subject to any disclaimer, the term of this patent is extended or adjusted under 35 U.S.C. 154(b) by 26 days.

(21) Appl. No.: 14/408,844

(22) PCT Filed: Jun. 18, 2013

(86) PCT No.: PCT/CA2013/000591
§ 371 (c)(1),
(2) Date: Dec. 17, 2014

(87) PCT Pub. No.: WO2013/188964
PCT Pub. Date: Dec. 27, 2013

(65) Prior Publication Data
US 2015/0132524 A1 May 14, 2015

(30) Foreign Application Priority Data
Jun. 18, 2012 (CA) ..................................... 2779969

(51) Int. Cl.
*B32B 3/24* (2006.01)
*B32B 3/30* (2006.01)
(Continued)

(52) U.S. Cl.
CPC ... *B32B 3/30* (2013.01); *B32B 3/02* (2013.01); *B32B 3/266* (2013.01); *B32B 3/28* (2013.01); *B32B 5/022* (2013.01); *B32B 5/142* (2013.01);
(Continued)

(58) Field of Classification Search
CPC .................... Y10T 428/15; Y10T 428/24281; Y10T 428/24314; D21F 1/0063; B32B 38/06; B32B 2038/045; B32B 3/266
USPC ............................ 428/43, 132, 136; 162/348
See application file for complete search history.

(56) References Cited

U.S. PATENT DOCUMENTS 3,162,567 A 12/1964 Heller
6,124,015 A 9/2000 Baker et al.
(Continued)

OTHER PUBLICATIONS

European Search Report dated Dec. 18, 2015; EP Application No. 13807297.0, PCT/CA2013/000591; 9 pgs.
(Continued)

*Primary Examiner* — Alexander Thomas
(74) *Attorney, Agent, or Firm* — Schmeiser, Olsen & Watts, LLP (57) ABSTRACT

A nonwoven industrial textile for conveying in an industrial process, seaming elements and methods of manufacture. The textile comprises at least first and second layers of film. Each layer comprises protrusions separated by land areas and each defining an aperture for a flow path through the layer. For at least one of the layers, the protrusions comprise a first set having first and second ends integral with contiguous land areas, and at least a second set of protrusions each comprising a first end integral with a contiguous land area and an opposing second end having a configuration selected from a detached free end; and a weakened end portion integral with but detachable from a contiguous land area in response to strain. The construction allows for relative movement of the layers during travel over machine components such as rolls, reducing internal strain and risk of delamination.

20 Claims, 10 Drawing Sheets

(51) Int. Cl.

| | |
|---|---|
| *B32B 7/08* | (2006.01) |
| *D06C 23/04* | (2006.01) |
| *B32B 3/26* | (2006.01) |
| *B32B 5/02* | (2006.01) |
| *D06C 15/00* | (2006.01) |
| *B32B 5/14* | (2006.01) |
| *B32B 7/04* | (2006.01) |
| *B32B 7/06* | (2006.01) |
| *B32B 27/12* | (2006.01) |
| *B32B 27/28* | (2006.01) |
| *B32B 27/32* | (2006.01) |
| *B32B 27/34* | (2006.01) |
| *B32B 27/36* | (2006.01) |
| *B32B 3/02* | (2006.01) |
| *B32B 3/28* | (2006.01) |

(52) U.S. Cl.
CPC ............... *B32B 5/147* (2013.01); *B32B 7/045* (2013.01); *B32B 7/06* (2013.01); *B32B 7/08* (2013.01); *B32B 27/12* (2013.01); *B32B 27/285* (2013.01); *B32B 27/286* (2013.01); *B32B 27/288* (2013.01); *B32B 27/32* (2013.01); *B32B 27/34* (2013.01); *B32B 27/36* (2013.01); *D06C 15/00* (2013.01); *D06C 23/04* (2013.01); *B32B 2250/02* (2013.01); *B32B 2250/20* (2013.01); *B32B 2262/0253* (2013.01); *B32B 2262/0261* (2013.01); *B32B 2262/0276* (2013.01); *B32B 2262/0284* (2013.01); *B32B 2307/50* (2013.01); *B32B 2307/542* (2013.01); *B32B 2307/552* (2013.01); *B32B 2307/581* (2013.01); *B32B 2433/00* (2013.01); *Y10T 428/15* (2015.01)

(56) References Cited

U.S. PATENT DOCUMENTS

| | | |
|---|---|---|
| 2010/0236740 A1 | 9/2010 | Mourad et al. |
| 2012/0244311 A1 | 9/2012 | Manninen |

OTHER PUBLICATIONS

International Search Report and Written Opinion; PCT/CA2013/000591; International Filing Date: Jun. 18, 2013; Astenjohnson, Inc.; 8 pgs.

IN-LINE SHEAR RESISTANT NONWOVEN TEXTILES COMPRISED OF SELECTIVELY SLIT AND EMBOSSED FILM

FIELD OF THE INVENTION

The invention concerns selectively slit and embossed film fabrics such as are described by Manninen in WO 2011/069259 (the '259 document). It is particularly concerned with such film fabrics which are constructed and arranged in a manner which allows for a controlled relative movement of the film layers during operation so as to minimize internal in-line stresses and shear created when the fabrics wrap about the peripheries of relatively small diameter rolls.

BACKGROUND/DISCUSSION OF PRIOR ART

The '259 document discloses that an industrial textile can be assembled from at least two layers of selectively slit and embossed polymeric film. As disclosed, the initially planar film is slit according to a chosen slitting pattern to provide permeability, and then deformed in a controlled process to form protrusions extending above the plane of the film, and land areas in the plane; two layers of film are joined by means of a chosen bonding process. The order in which these processes of bonding, slitting and deformation are performed can be selected depending on the intended end use properties of the film. The slitting and deformation processes form apertures beneath the protrusions at locations in the film where it is embossed. The '259 document discloses that industrial textiles having utility in industrial conveying and filtration processes such as papermaking and the like can thus be formed; other uses are possible and are within the scope of the invention.

In the papermaking process, a dilute slurry consisting of less than 1% papermaking fibers together with a mixture of about 99% water and other papermaking components is ejected at high speed and precision from the slice opening of a headbox onto a moving forming fabric. The fabric is guided and driven by a number of rolls over various drainage boxes and foils which assist in the removal of water so as to leave behind a randomly dispersed, loosely cohesive network or web of papermaking fibers. At the end of the forming section, this web is transferred to the press section, where further water removal occurs by mechanical pressures as the web is conveyed on or between a series of press fabrics through one or more nips. The now self-supporting but still very wet web is then transferred to the dryer section of the papermaking machine where it is conveyed in serpentine fashion around the periphery of many steam heated dryer cylinders (or cans) while supported by several dryer fabrics until the remaining water is removed by evaporation. The resulting paper product may then be exposed to various treatments before it is then finally wound onto a reel, cut to size and packaged for shipment.

As a dryer fabric conveys the sheet through the dryer section, it passes at speed around the periphery of numerous rolls, including the heated dryer cylinders themselves as well as various smaller diameter guide rolls, vacuum rolls, return rolls, and so on. In so doing, an outer surface of a first film layer of these double layer fabrics will travel a greater distance than an inner surface of a second similar film layer (see, for example, EP 806519, para. 0009, line 20). The difference between the travel distances of each of the two layers becomes more pronounced as roll diameters decrease. This can cause internal stresses in the fabric which may eventually lead to premature delamination of the two film layers.

In between the exterior surfaces of the two fabric layers there also exists a planar region that undergoes zero strain as the fabric bends and wraps about these rolls; this region exists in all textiles and is referred to as the neutral plane. The neutral plane always travels at the same speed regardless of the radius of curvature to which the fabric is exposed.

In instances where the film fabric is created by aligning and joining the two layers with their flat planar surfaces together, such as shown in FIG. 11a or 11b of the '259 document, so that the contact and joining region of the two layers will be at or near the neutral plane in the interior of the fabric, the protrusions on the two outer surfaces will be subjected to minimal, if any, mechanical stresses. However, when the fabric is assembled such that the protrusions of each layer are mated to the land areas of the other, the neutral plane will not coincide with either of the surfaces where the joints are formed. When in use in an industrial environment where the fabric must repeatedly pass about the circumference of relatively small diameter rolls, the repetitive stress and strain on these bonds due to differences in travel distances between each of the two layers will cause the joins (in particular welded joins) to flex repeatedly, possibly leading to their premature failure due to in-line shear forces.

If, however, the joints between the two film layers are sufficiently flexible, such that one film layer can slide and move to a small extent relative to the other, then any stresses created by the deformation of the fabric and between the two layers as they curve about one or more rolls can be significantly reduced or eliminated, to avoid delamination of the fabric. The present invention provides a means whereby such relative movement of the two film layers in these fabrics can occur as they wrap portions of the peripheries of small diameter rolls, without adversely affecting bond strength between the two film layers.

According to the invention, at least some of the protrusions formed in a first suitably embossed film layer intended for use in a nonwoven industrial fabric such as that described in the '259 document are shaped such that a first end of the protrusion is integral to and contiguous with a land area in the film, and an opposing second end is either completely detached from the film, or is weakened such that, under strain, it is detachable from the film, so as to form a "tab" or tab-like configuration. When the first film layer is joined to a second mutually compatible film layer during assembly, the first layer is bonded to the second only to the upper surfaces of the detached or detachable protrusions. Because the tab-like protrusions are either detached or are detachable from the film at one end only, movement of the first film layer relative to the second is now possible while still maintaining a strong bond between the two film layers. The remaining protrusions, in which both the forward and rearward end walls are contiguous and integral to the film layer in which they are formed, and may have any suitable configuration, for example one which is compression resistant or otherwise intended to enhance selected fabric properties. In this way, the resulting nonwoven film fabric retains properties and characteristics similar to those of a woven textile. The number and location of non-tab-like protrusions on the first film layer are selectable in accordance with desired end use characteristics of the film fabric.

SUMMARY OF THE INVENTION

The invention therefore seeks to provide a nonwoven industrial textile for conveying in an industrial process, the industrial textile comprising at least a first layer and a second layer of film, each layer having an upper surface and a lower surface, wherein
- (i) each layer comprises a plurality of protrusions separated by land areas and each defining an aperture extending from the upper surface to the lower surface, and
- (ii) for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
  - (a) a detached free end; and
  - (b) a weakened end portion integral with but constructed and arranged to be detachable from a contiguous land area in response to strain.

The invention further seeks to provide a seaming element for a nonwoven industrial textile, the industrial textile being constructed and arranged according to any one of claims 1 to 10, the seaming element comprising at least a first layer and a second layer of film, each layer having an upper surface and a lower surface, wherein
- (i) each layer comprises a plurality of protrusions separated by land areas and each defining an aperture extending from the upper surface to the lower surface, and
- (ii) for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
  - (a) a detached free end; and
  - (b) a weakened end portion integral with but constructed and arranged to be detachable from a contiguous land area in response to strain.

The invention further seeks to provide a method of making a nonwoven industrial textile for conveying in an industrial process, the method comprising the steps of
(a) providing at least a first layer and a second layer of film, each layer having an upper surface and a lower surface;
(b) selectively embossing each of the first layer and second layer of the film to provide a plurality of protrusions separated by land areas and selectively cutting each protrusion to define an aperture extending below the protrusion from the upper surface to the lower surface of the film, wherein
for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
  (A) a detached free end; and
  (B) a weakened end portion integral with but constructed and arranged to be detachable from a contiguous land area in response to strain; and
(c) securing the first layer to the second layer.

Preferably, the selective cutting and embossing in step (b) comprises
(b.1) selectively cutting each layer of the film to provide a plurality of slits extending from the upper surface through to the lower surface;
(b.2) selectively applying pressure to selected portions of each layer to provide the plurality of protrusions separated by land areas; and
(b.3) aligning selected protrusions of the first layer with land areas of the second layer, and aligning selected protrusions of the second layer with land areas of the first layer.

Alternatively, step (b) comprises
(b.1) selectively applying pressure to selected portions of the film to form protruding embossed areas separated by land areas, creating a contoured profile in the upper surface;
(b.2) selectively cutting and removing material from at least one of the sidewalls of at least some of the protruding embossed areas to define the plurality of protrusions; and
(b.3) aligning selected protrusions of the first layer with land areas of the second layer, and aligning selected protrusions of the second layer with land areas of the first layer.

The invention further seeks to provide a method of making a nonwoven industrial textile for conveying in an industrial process, the method comprising the steps of
(a) providing at least a first layer and a second layer of film, each layer having an upper surface and a lower surface;
(b) selectively embossing each of the first layer and second layer of the film to provide a plurality of protrusions separated by land areas wherein for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
  (A) a detached free end; and
  (B) a weakened end portion integral with but constructed and arranged to be detachable from a contiguous land area in response to strain;
(c) aligning selected protrusions of the first layer with land areas of the second layer, and aligning selected protrusions of the second layer with land areas of the first layer, and securing the first layer to the second layer; and
(d) selectively cutting each protrusion to define an aperture extending below the protrusion from the upper surface to the lower surface of the respective layer.

In the textiles, seaming element and methods of the invention, optionally each of the first layer and second layer comprises protrusions of the second set.

Optionally, each of the first layer and the second layer comprises protrusions of the first set having the same configuration on each layer.

Preferably, for each layer having protrusions of the second set, the protrusions of the second set comprise at least 25% of a total of the protrusions on that layer, and more preferably for each layer having protrusions of the second set, a ratio of the number of protrusions of the second set to the number of protrusions of the first set is 1:3.

Optionally, each of the protrusions of the first set has a body comprising a top member having opposed first and second lateral edges and is supported by opposed compression resistant first and second end walls, at least one of the lateral edges cooperating with the end walls to define an aperture extending from the upper surface to the lower surface, each end wall having a base edge connected to an adjacent land area and having a configuration selected from at least one of
  (a) the base edge being convexly curved away from the protrusion body; and
  (b) each end wall extending below at least a part of each of the first and second lateral edges and being connected to each of the first and second lateral edges.

Preferably, the protrusions of the second set are secured to land areas on the opposing one of the first and second layer, and preferably are welded to land areas on the opposing one of the first and second layer. Preferably, the textiles and seaming element of the invention are constructed of a thermoplastic polymer material, selected from polyethylene terephthalate (PET), polybutylene terephthalate (PBT), polyethylene naphthalate (PEN), polycyclohexane dimethanol terephtalate (PCTA), polypropylene (PP), a polyamide, a polyolefin, polyphenylene sulphide (PPS) and polyether ether ketone (PEEK); and preferably the material is bi-axially oriented and hydrolysis stabilized.

Optionally, the textiles and seaming element can be constructed of an oriented multi-layer polymer film comprising at least two thermoplastic polymeric layers, wherein at least one of the layers includes a radiation absorbent material to provide a weldable outer surface of the polymer material and at least one of the layers permits through transmission of laser energy.

Optionally, the textiles of the invention comprise a textile body having a first seamable end and a second seamable end, a first seaming element provided at the first seamable end and a second seaming element provided at the second seamable end, wherein the first and second seaming elements are constructed and arranged to be secured together to form a seam.

In such embodiments, preferably each of the first and second seaming elements comprises at least a first layer and a second layer of film, each layer having an upper surface and a lower surface, wherein (i) each layer comprises a plurality of protrusions separated by land areas and each defining an aperture extending from the upper surface to the lower surface, and (ii) for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from (a) a detached free end; and (b) a weakened end portion integral with but constructed and arranged to be detachable from a contiguous land area in response to strain.

Optionally, at least one of the first seaming element and the second seaming element is integrally constructed with the textile body at the respective seamable end.

The methods of the invention optionally further comprise providing a pair of seaming elements to the textile, wherein each seaming element comprises at least a first layer and a second layer of film, each layer having an upper surface and a lower surface, wherein (i) each layer comprises a plurality of protrusions separated by land areas and each defining an aperture extending from the upper surface to the lower surface, and (ii) for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from (a) a detached free end; and (b) a weakened end portion integral with but constructed and arranged to be detachable from a contiguous land area in response to strain.

DETAILED DESCRIPTION OF THE FIGURES

Figure 1:
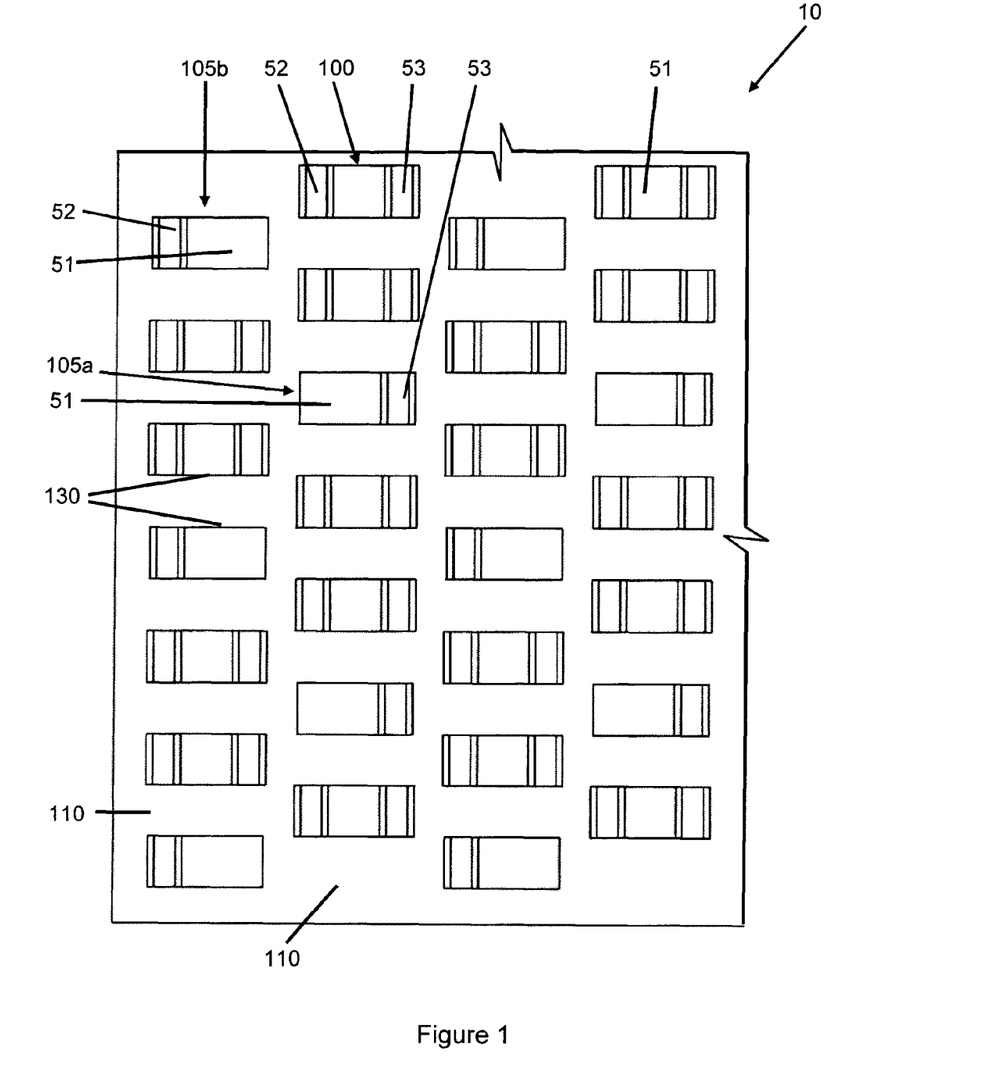
FIG. 1 is a plan view of a portion of a profiled and selectively slit film layer in an embodiment of the invention.
Figure 2:
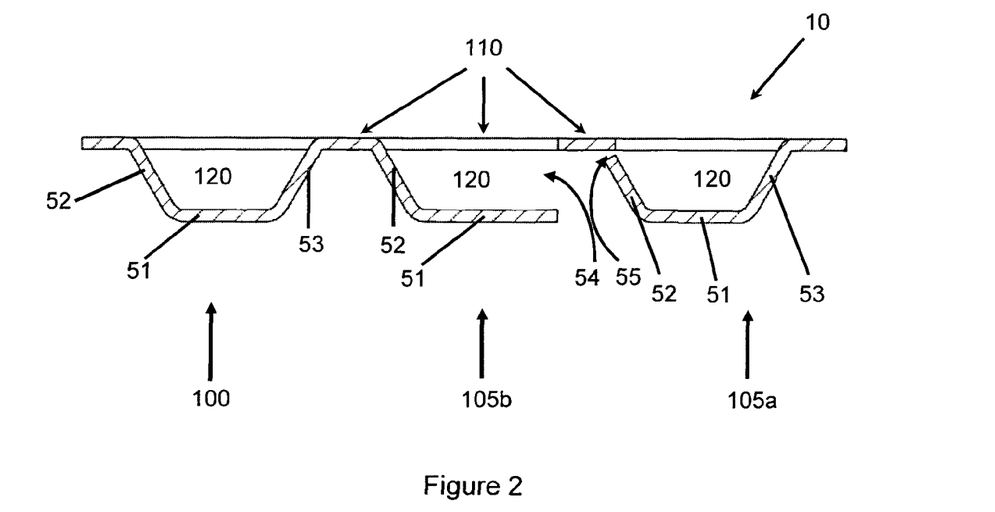
FIG. 2 is a cross-sectional view of the film layer shown in FIG. 1.

Referring to FIGS. 1 and 2, these are respectively a plan view and a cross-sectional view showing a film 10 in an embodiment of the invention, provided with a plurality of protrusions of three different types. Protrusions 100 are constructed in the manner shown in WO 2011/069259 (Manninen), and each comprise upper surface 51, and end walls 52, 53 each integral with adjacent planar land areas 110. Slits 130 at lateral edges provide for apertures 120 (see FIG. 2) beneath each of protrusions 100, allowing for a flow path through the film 10 between its upper surface and lower surface. Protrusions 105a are profiled in a similar manner to protrusions 100 to be compatible therewith, slits 130 at their lateral edges provide apertures 120, and end walls 53 are constructed integrally with adjacent land areas 110, but end walls 52 although constructed integrally with adjacent land areas 110 are provided with weakened and detachable region 55, so that when subjected to strain in an assembled film fabric, walls 52 will detach from film layer 10 at region 55. Protrusions 105b are profiled in a similar manner to protrusions 100 to be compatible therewith, slits 130 at their lateral edges provide apertures 120, and end walls 52 are constructed integrally with adjacent land areas 110, but end walls 53 are cut during construction so as to be detached from adjacent land areas 110.

Referring to FIG. 2, an exemplary view of one of each type of protrusion is shown. First protrusion 100 serves to provide support to a second overlying film layer, and openings to provide a flow path through two film layers when assembled. As described above, second protrusion 105a comprises detachable end wall 52 and third protrusion 105b comprises detached end wall 53. Detached protrusions 105b can be configured so that either the free end of the protrusion extends in the plane of upper surface 51, as shown for protrusions 105b, or retains a configuration similar to that of protrusions 105a and protrusions 100, i.e. the free end remains close to the adjacent land area 110 at region 54 without being connected thereto.

Planar top surfaces 51 of any of protrusions 105a, 105b can be bonded to corresponding planar land areas of an opposing film layer, so as to secure the layers together, while the detached end walls allow the advantageous small relative movement between the layers when the assembled structure, in use in an industrial process, passes over regions of differing stress, such as wrapping about small diameter machine rolls, as discussed above, without causing undue stress at bond points between the two film layers due to in-line shear forces.

As shown in FIGS. 1 and 2, each of protrusions 105a is shown as facing in the same direction, with their detachable end walls 52 to the left across the page, and each of protrusions 105b is shown as facing in the same direction, with their detached end walls 53 to the right across the page, so that the detached/detachable portions face in opposite directions. However, the type of projection selected, and their configuration and orientation in the overall design of film layer 10 is not restricted in this manner, and suitable arrangement and configuration for the various types of projection can be selected according to factors including the intended end use of film layer 10 in an assembled multi-layer structure, and the need to be compatible with the configuration to be selected for a second layer of film to which film layer 10 will be attached.

It will be appreciated that protrusions 105a and/or 105b can be provided as some or all of the protrusions in a single film layer 10; and that they can be provided to each of two film layers to be assembled together. However, at least one of two such film layers should be provided with some protrusions 100, to impart the necessary compression resistance and open area between the two film layers to allow for permeability through the assembled film structure. It has been found that the ratio shown in the figures is generally preferable, i.e. the total number of protrusions 105a and/or 105b comprises about one third of all protrusions in one film layer; however, this amount may be increased or decreased according to factors including the intended end use of the assembled two layer structure.

Figure 3:
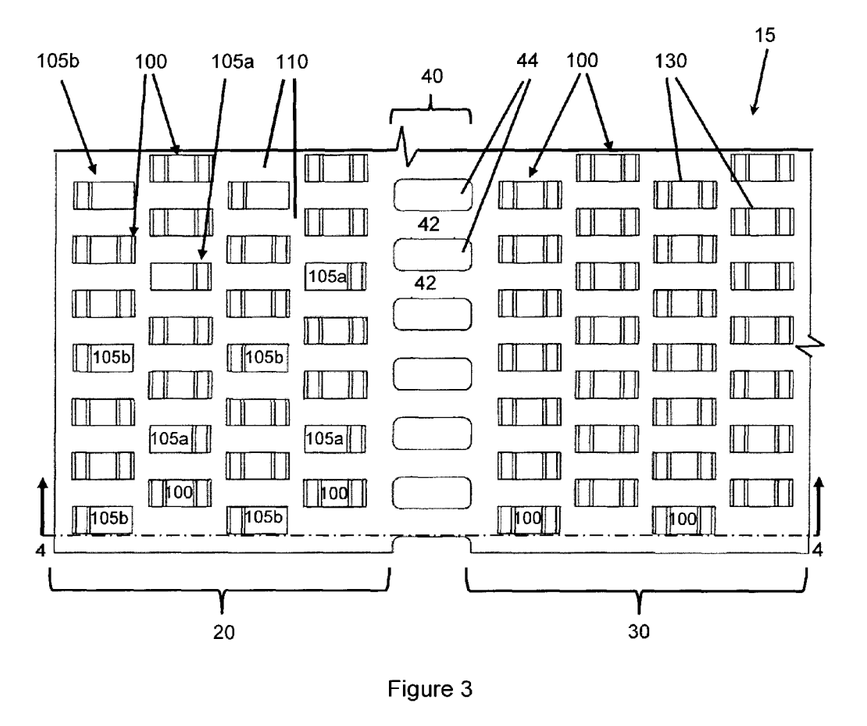
FIG. 3 is a plan view of the end region of a film structure in an embodiment of the invention.
Figure 4:
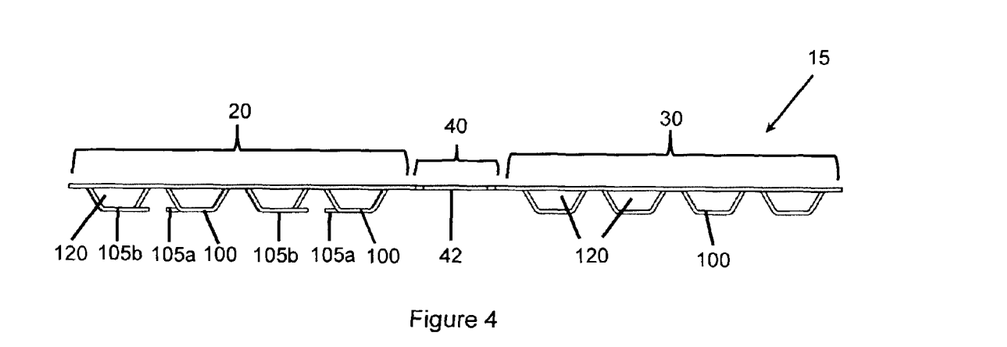
FIG. 4 is a cross-sectional view of the film structure of FIG. 3.

Referring now to FIGS. 3 and 4, these show, in plan view and cross-section respectively, an arrangement of two differing regions in an embodiment of the invention, suitable for use as an end region of film 15, or as a separate seaming element for attachment as a pair to each of opposing ends of a similarly profiled, nonwoven industrial textile, so that the pair of seaming elements can be secured together, for example by means of a pin or pintle, as will be described in more detail below.

As shown in FIG. 3, end regions 20 and 30 are constructed and arranged according to a first embodiment of the invention, and are separated from each other by a seam region 40. When used in the two layer film fabrics of the invention, one option is for one of the two film layers in a fabric to be configured as shown in end region 20, while the other film layer would be configured similarly to region 30; however, as noted above, other configurations can be selected, subject to the factors noted above.

Film 15 is shown after the steps of slitting and thermoforming, which can be performed in any desired order prior to assembly of the layers into a single unit; and is depicted here as if unfolded and laid flat to display its intended interior surface. As shown in FIG. 3, second end region 30 of film 15 is formed from the same sheet of film as first end region 20 and seaming area 40. First end region 20 is profiled and slit to provide protrusions 100, 105a and 105b, in the same configuration as in FIG. 1, whereas second end region 30 comprises only a set of protrusions 100. The respective protrusions on each of first and second end regions 20, 30 are each separated from adjacent protrusions by land areas 110, which are dimensioned to receive protrusions from the respective opposing layer.

As shown in FIG. 4, each of protrusions 100, 105a and 105b provides an aperture 120 for a flow path through the two layers, such that when the protrusions of each layer are aligned with land areas in the respective opposing layer, the flow path is continuous between both outer surfaces of the fabric or element.

Seam region 40 comprises a plurality of aligned land areas 42 defining a plurality of openings 44. When film 15 is folded along the centre line of seam region 40 and the protrusions 100, 105a and 105b of each of first and second end regions 20 and 30 are aligned with respective opposing land areas 110, land areas 42 will become loops each separated from the next by openings 44, as shown more clearly in FIG. 5 and discussed further below in relation to that figure.

For the main body of the film fabrics of the invention, the two layers will be assembled together such that the top surfaces 51 of the protrusions 100, 105a, 105b of each layer are brought into contact with planar land areas 110 of the opposing layer, and secured by bonding of selected ones of protrusions 105a, 105b to the respective land areas 110.

Where the configuration of FIG. 3 is used for a separate seaming element, the element can be secured to a seamable edge of a fabric body by means of an appropriate bonding process such as laser welding, ultrasonic welding, chemical bonding or the like.

As noted above, the pattern of protrusions in first end region 20 of the embodiment of FIG. 3 is the same as in FIG. 1. In each vertical row (from top to bottom of the figure) there is one protrusion 105a or 105b for each two protrusions 100; and the type of protrusion 105a or 105b alternates between these rows. The detached or detachable free ends of the protrusions 105a and 105b are opposed in orientation, but as noted above, various configurations can be selected.

Figure 5:
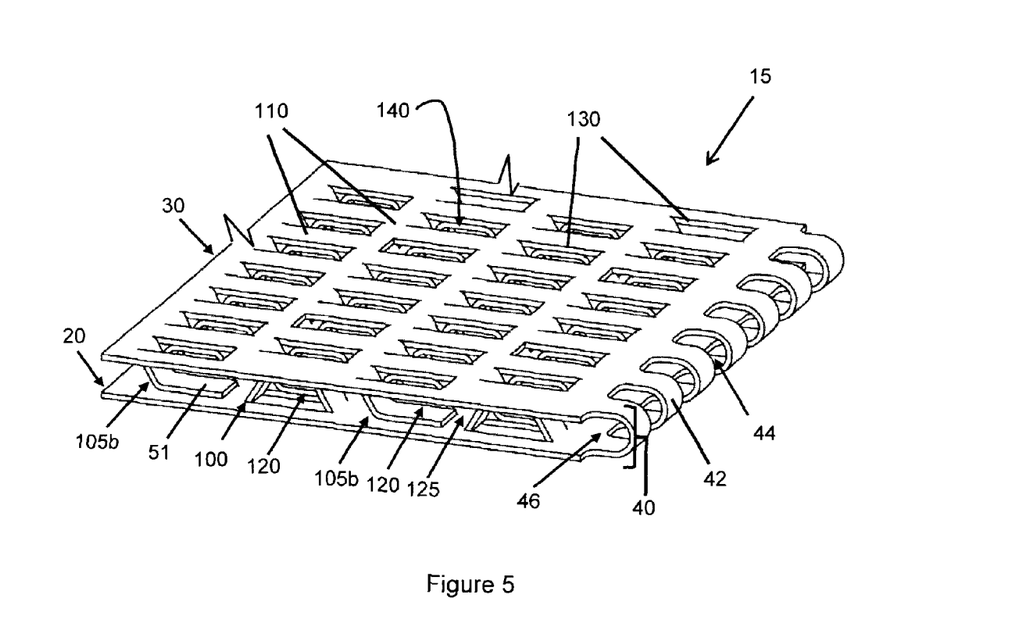
FIG. 5 is a perspective view of the film structure of FIG. 3 in a folded position.
Figure 6:
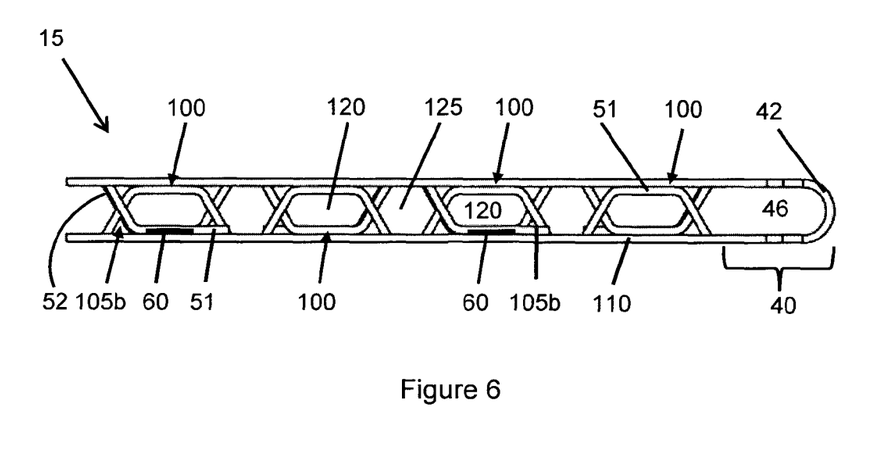
FIG. 6 is a cross-sectional view of the folded film structure of FIG. 5.

Referring now to FIGS. 5 and 6, these show, in perspective and cross-section respectively, the embodiment of FIGS. 3 and 4 in a folded position, and secured together, in the following manner. When film 15 is folded along the centre line of seam region 40, this brings the planar upper surfaces 51 of the protrusions 100 on second end region 30 into contact with the land areas 110 on the first end region 20, and the planar upper surfaces 51 of protrusions 100, 105a and 105b in the first end region 20 into corresponding contact with land areas 110 in the second end region 30. The planar upper surfaces 51 of protrusions 105a and 105b in first end region 20 are then bonded, for example by laser welding, to corresponding land areas 110 in the second end region 30 at bond locations 60. Due to the flexibility provided to the detachable walls 52 of protrusions 105a and the detached walls 53 of protrusions 105b, at the respective detachment areas 55, 54 (see FIG. 2), the respective opposing walls 53, 52 are able to move longitudinally in response to bending stresses encountered as the fabric passes at speed about the periphery of rolls during use; this provides the advantage, discussed above, of allowing the two film layers of the assembled structure 15 to move relative to one another thus avoiding or significantly reducing internal stresses which could otherwise lead to delamination of the two layers.

As can be seen from FIG. 5, depressions 140 formed during the embossing process become apertures 120 beneath each of the protrusions, providing a flow path through the two layer structure. The land areas 110 between the rows of protrusions on each layer provide channels 125 across the structure. These features provide the structure with the desired void volume and permeability to fluids.

After assembly into the structure shown in FIGS. 5 and 6, land areas 42 form a set of loops which can be intermeshed with corresponding openings 44 from a second similarly shaped seam region at the opposing end of the film fabric to be joined, such that the aligned sets of loops together form a channel into which a pintle or pin can be installed, to join the two seam areas together. Reference is made in this connection to CA 2,749,477 (Manninen) which disclosure is incorporated herein by reference.

Figure 7:
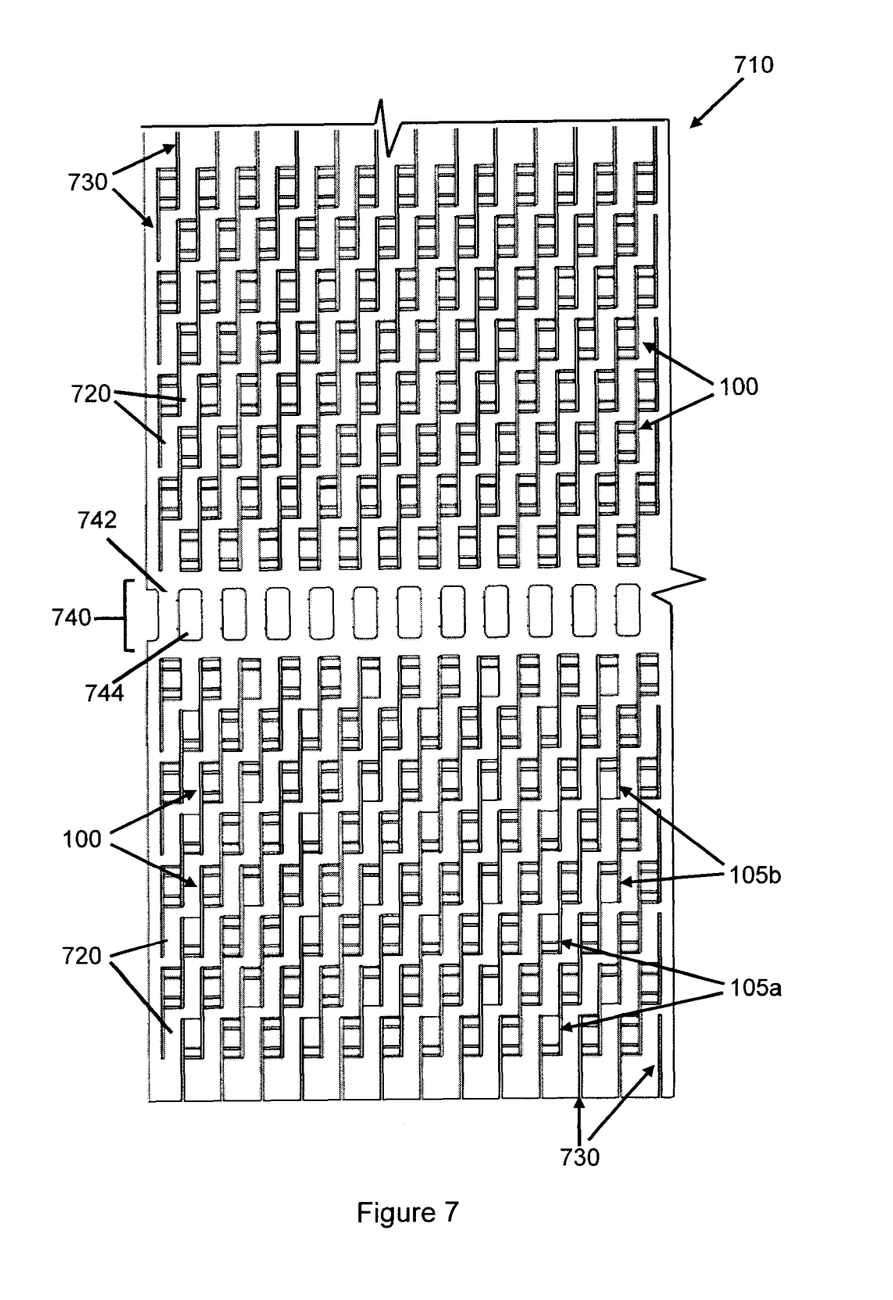
FIG. 7 is a plan view of a profiled and selectively slit film layer in a further embodiment of the invention.

FIG. 7 is a plan view of a film layer in another embodiment of the invention. Film layer 710 is similar to that shown in FIGS. 1 to 6; however, in this embodiment, the length of slits 730 has been increased over that shown in the previous figures so as to be equal to the length of two successive protrusions in any given column. As in FIGS. 1 to 6, the detachable or detached protrusions 105a and 105b are located exclusively on a first end region on one side of seaming area 740, comprising land areas 742 defining openings 744, and are constructed and arranged to be bonded to corresponding land areas 720 on the second end region in the manner described above with respect to FIGS. 1 to 6. The slits 730 are extended so as to impart more flexibility to the film and resulting fabric, resulting in an effect more similar to that of a woven textile. As in the previous embodiment, the slits 730 are precision cut into the film layer 710 to remove lateral side walls from each protrusion 100, 105a and 105b. The slits 730 can made shorter or longer as desired, although their maximum length will to some extent be dictated by the environmental conditions under which the film fabric is intended to operate. As the length of the slits 730 is increased, the diagonal stability (i.e. the ability of the assembled structure to resist distortion due to stresses acting on it during operation) of an assembled film fabric comprised of two layers of slit and profiled film such as 710 decreases.

Figure 8:
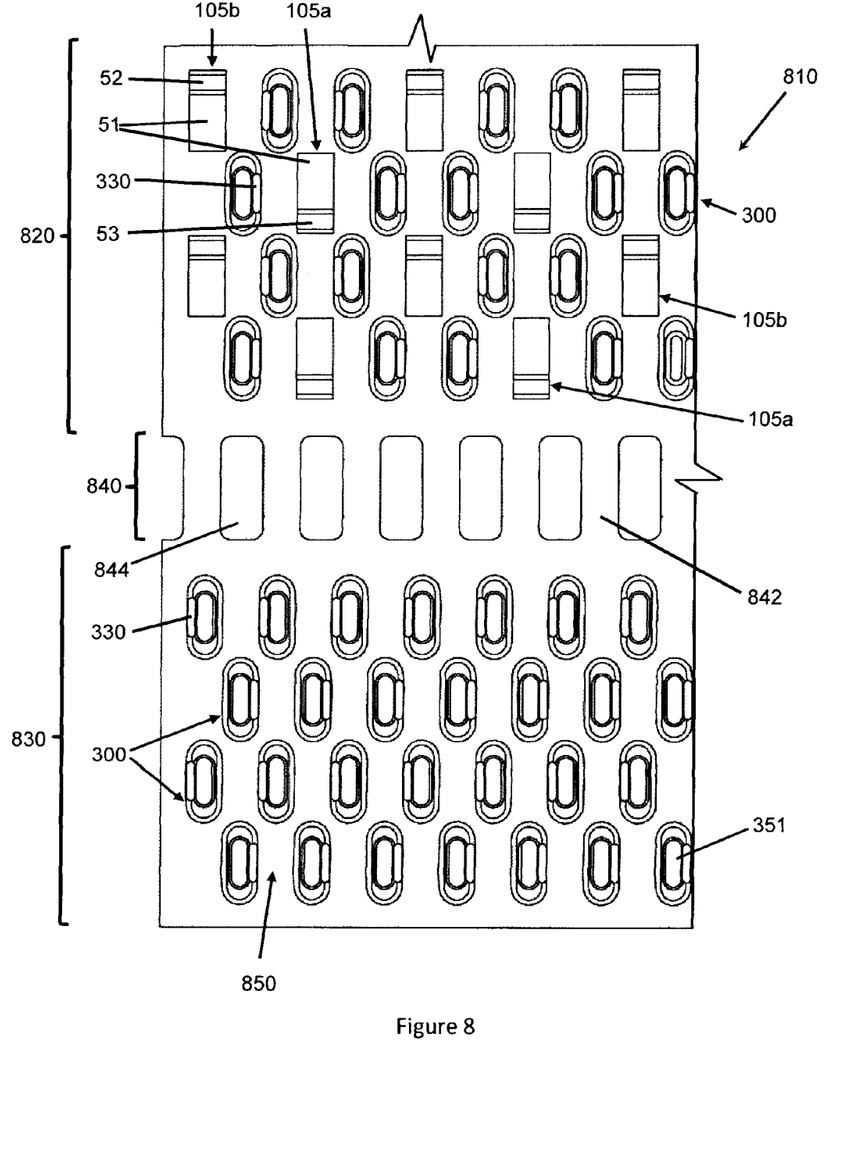
FIG. 8 is a plan view of a profiled and selectively slit film layer in a further embodiment of the invention.
Figure 9:
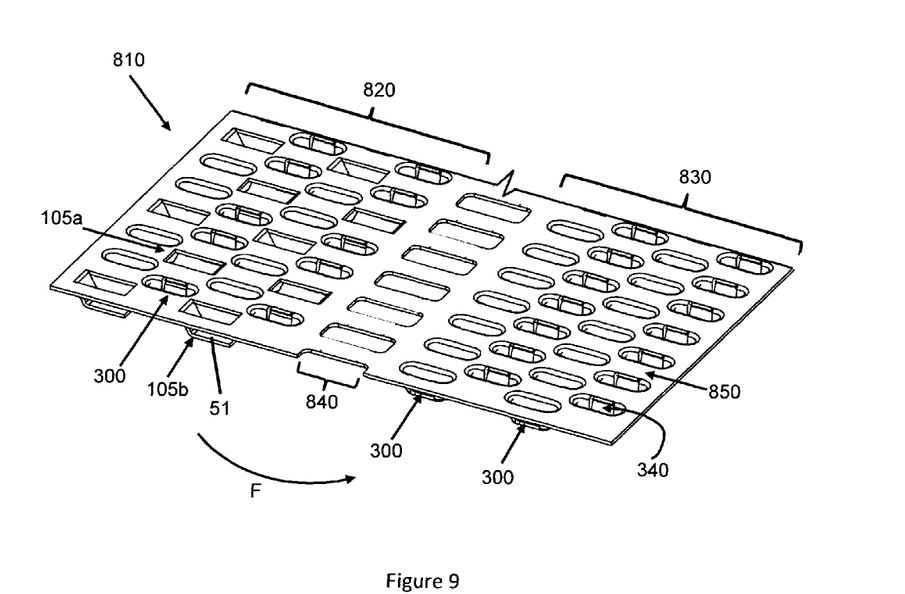
FIG. 9 is a perspective view of the film layer shown in FIG. 8.
Figure 10:
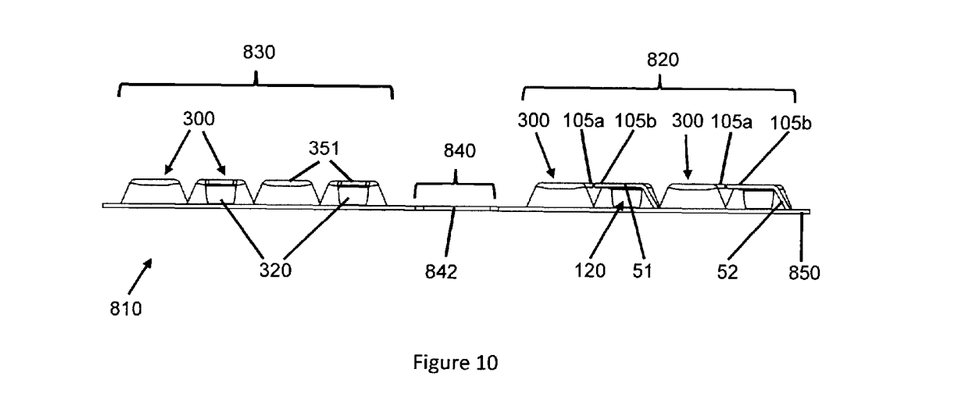
FIG. 10 is a cross-sectional view of the film layer of FIG. 8.

FIG. 8 is a plan view of a further embodiment of the invention, seen also in perspective and cross-section in FIGS. 9 and 10 respectively. In this embodiment, selectively slit and embossed film layer 810 has first and second end regions 820 and 830, which are constructed and arranged in a manner similar to the embodiments of the invention discussed above in relation to FIGS. 1 to 7, and which regions are separated from each other by seam area 840. In this exemplary embodiment, film layer 810 comprises a bi-axially oriented thermoplastic polymer film material, such as a polyester, and has a thickness that is in a range which would be suitable for use in industrial textiles such as from about 100μ to about 500μ.

In this embodiment, second end region 830 is shown as having been formed from the same sheet of film as first end region 820 and seaming region 840, and profiled and slit such that some of the protrusions are provided as detachable protrusions 105a and detached protrusions 105b, in the same manner as previously described in relation to FIGS. 1 to 7. However, first and second end regions 820 and 830 each include shaped compression resistant protrusions 300, which in this exemplary embodiment are constructed as described in CA 2,779,131 (Manninen) incorporated herein by reference. Protrusions 300 include planar upper surfaces 351 supported by compression resistant side walls.

Figure 12:
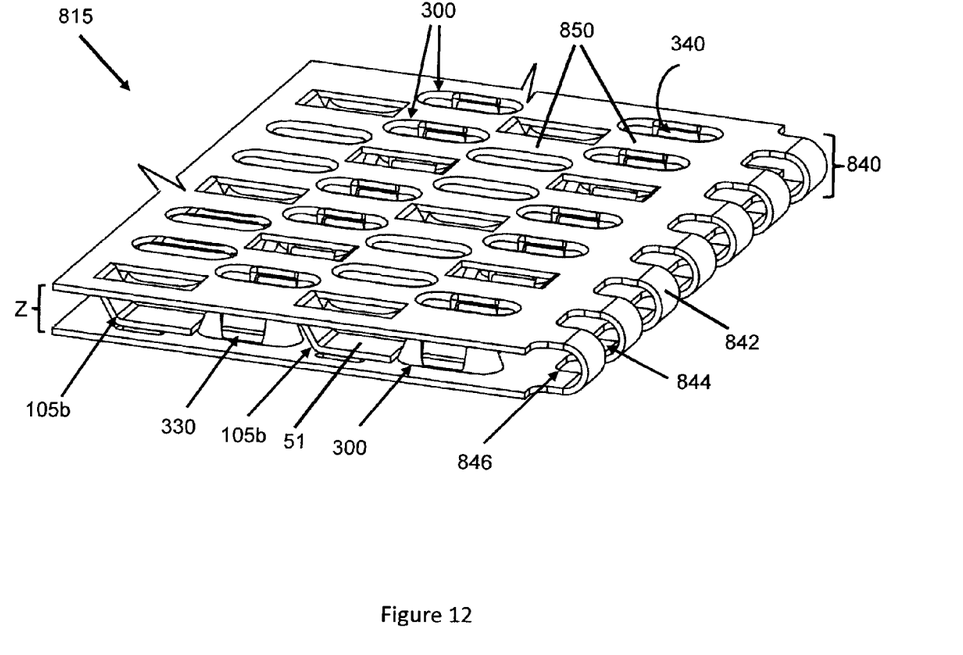
FIG. 12 is a perspective view of the folded film layer of 11.

Second end region 830 includes only protrusions 300 which are shaped so as to provide a measure of compression resistance to the assembled film structure 815 (see FIG. 12). First end region 820 is shown as including three protrusion shapes: protrusions 300, as in second end region 830; and protrusions 105a and 105b, constructed and arranged in the manner described above in relation to FIGS. 1 to 7.

First and second end regions 820 and 830 of film layer 810 are separated by seam area 840 which comprises land areas 842 defining openings 844. As seen in FIG. 12, when film layer 810 is folded along the centre line of seam area 840, land areas 842 will become loops, each of which is separated from the next by an opening 844.

When assembled in the manner intended, as described below in relation to FIGS. 11 and 12, upper surfaces 351 of protrusions 300, as well as upper surfaces 51 connected to continuous walls 53, 52 of protrusions 105a, 105b respectively, are located on planar land areas 850 on the opposing film surface between opposing protrusions. Slits 330 in film layer 810 remove a portion of the lateral side walls from protrusions 300 and form flow-through apertures 320 in these walls (see FIG. 10). Slits 330 may be created following fabric assembly and after the individual film layers such as 810 are formed.

Figure 11:
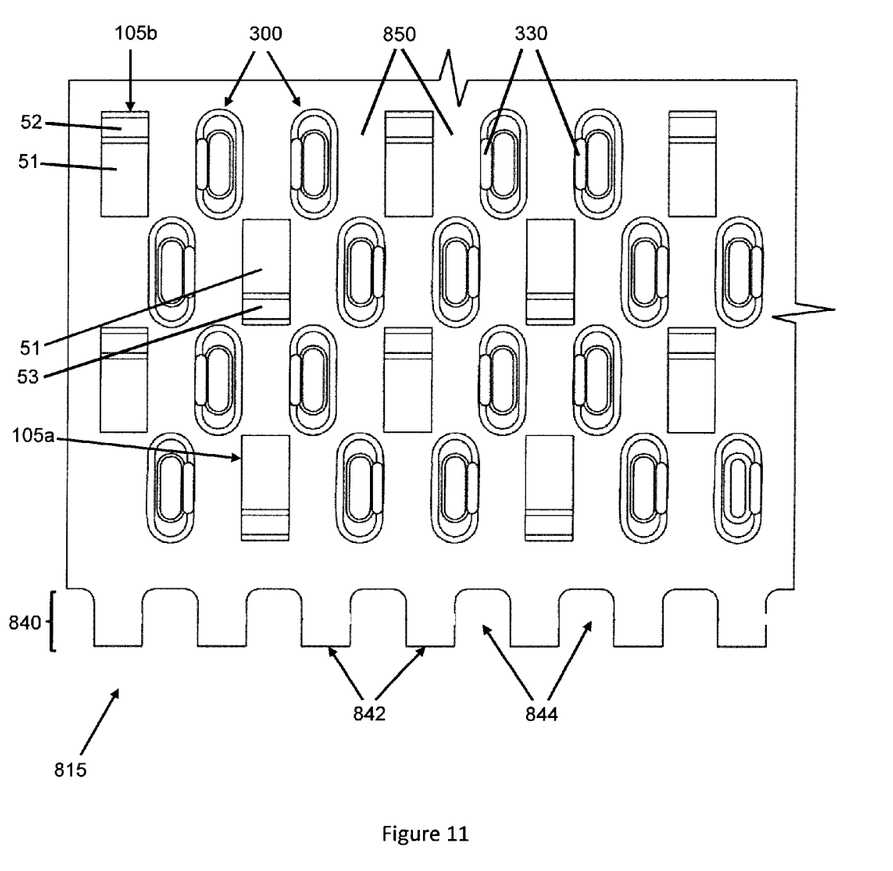
FIG. 11 is a plan view of the film layer shown in FIG. 8 following a folding process.

Referring also to FIGS. 11 and 12, the assembled film structure 815 is provided by folding layer 810 at the centre line of seam area 840 in the direction indicated by arrow F in FIG. 9, to bring the planar upper surfaces 51 and 351 of protrusions 105a, 105b and 300 of first end region 820 into aligned contact with planar land areas 850 of second end region 830. As in the embodiments discussed above, surfaces 51 of protrusions 105a, 105b will be bonded to planar regions by suitable means, such as laser welding.

As shown in FIG. 12, the resulting structure 815 has a thickness Z whose interior dimension is equal to the height of the protrusions 300 which are not flexible; the structure 815 is bonded together at upper surfaces 51 of protrusions 105a and 105b so that first and second end regions 820 and 830 can slide relative to each other in the assembly 815, to the extent needed to avoid excessive internal strain. Since the slitting process is applied to all locations across the fabric where protrusions such as 300, 105a and 105b are located, the resulting structure can be provided with a desired openness to its interior to allow the flow-through required for the intended end use.

The nonwoven industrial textiles of the invention are assembled from two separate independent film layers, each of which is selectively precision cut or slit, and embossed using heat and pressure, so as to permanently deform them to provide mutually compatible protrusions and land areas such as have been described above and which can be interconnected. Thermoplastic polymeric films having a thickness in the range of from about 100 to about 500 μm are preferred for this purpose, as they possess the necessary physical properties making them useful in industrial conveying and filtration applications, and are readily shaped and cut in the manner described.

Materials which are particularly suitable for use as the film layers of the invention are described in WO 2013071419 (Manninen) or CA 2,778,513 (Manninen); and include thermoplastic polymers, in particular polyesters such as hydrolysis stabilized polyethylene terephthalate (PET), polybutylene terephthalate (PBT), polyethylene naphthalate (PEN), polycyclohexane dimethanol terephthalate (PCTA); olefins such as polypropylene (PP); polyamides (PA) such as PA-6, PA-6/6, PA-6/10, PA-6/12 and the like; polyphenylene sulphide (PPS) and polyether ether ketone (PEEK), all of which will provide satisfactory results. For many applications, bi-axially oriented hydrolysis stabilized films are particularly preferred.

To make the slit and profiled films used in the industrial fabrics of the invention, a suitable width and length of a generally planar film is first obtained. There are various options as to the sequence of steps taken in constructing the profiled films.

In a first method, the film is fed through a precision guided laser cutting apparatus which has been configured to create a plurality of slits in the film corresponding to the positions of the lateral sides of the protrusions which, when the film is embossed, will form apertures. At locations where it is desired to locate a detached protrusion, the protrusion area is slit on three sides of the generally rectangular eventual tab shape. Depending on the embossing process selected, the free end of the protrusion may extend in the plane of upper surface 51, as shown for protrusions 105b, or retain a configuration similar to that of protrusions 105a. At locations where a detachable protrusion is required, two sides of the tab area are fully slit, while the third (forming the detachable free end) is perforated (i.e. it is intermittently slit) so as to be eventually detachable when the assembled structure is exposed to in-line shear such as when passing at speed around rolls of small diameter. The now selectively slit and perforated film is then embossed under heat and pressure, either sequentially or concurrently, using suitable means such as a shaped planar platen or embossing roll so as to permanently impart the desired pattern of raised protrusions and depressions on the appropriate surfaces. Both film layers are separately cut and embossed in this manner, and then assembled as shown in the appended figures. The assembly of film layers is then laser welded together at selected locations where the planar surfaces of the detached and detachable tabs of one film layer are in contact with generally planar film surfaces of the opposing film layer. By welding the two film layers together at these selected locations, one layer of the assembly is able to move relative to the other in response to in-line shear forces created in the nonwoven industrial fabric; the remaining (nonwelded) protrusions support each opposing film layer and contribute to the permeability and interior void volume of the resulting assembly. Multiple lengths of the slit and embossed film can be assembled together, generally preferably offsetting the join area between two strips of one layer to be over the general midpoint of another strip in the second layer. The strips can be arranged and joined so as to be either perpendicular to the intended direction of travel of the final fabric, i.e. the cross-machine direction (CD), or in the direction of travel, i.e. the machine direction (MD). The assembled film layers may be further processed to stabilize them or impart any fine surface characteristics, such as striations or coatings. The seamable ends of the fabric can be provided with a seam area according to the invention, i.e. integral to the body of the fabric; or a separate seaming element can be provided to each end of the fabric, either constructed according to the invention, or as described in WO 2010121360 (Manninen et al.), which in either case can then be bonded to each opposing end of the assembled film layers to complete the nonwoven industrial textile.

In a second alternate method, each of two generally planar and suitable film layers is first embossed under heat and pressure to permanently impart to each a chosen profile of raised protrusions and depressions and generally planar land areas. Each film layer is then selectively slit and perforated according to the desired pattern and in the manner described above so as to cut through and remove at least a portion of the lateral side material of the protrusions so as to form flow-through apertures. The detached or detachable protrusions can then be formed as described above. The two layers of embossed and selectively slit film are then arranged over one another such that the planar top surfaces of the protrusions in a first layer are in contact with the planar land areas between the protrusions on the opposing second film layer, and vice versa. The two film layers are then bonded together by laser welding only at selected locations where the planar top surfaces of detached or detachable protrusions of each layer are in contact with planar land areas in the opposite layer. The film layers may be arranged so as to be offset in relation to one another so that the edge of each strip of film in a first layer is located intermediate of a film strip in a second layer. The desired length and width of the final nonwoven industrial textile is built up in this manner; a seaming element is then attached to each opposing end to enable it to be joined on the machine for which it is intended.

In a third alternate method, the two separate film layers are each embossed using heat and pressure to impart differing but compatible patterns of raised protrusions between which are located planar land areas; the two embossed film layers are then brought together and suitably aligned, then laser welded to permanently join them together. Each surface of the now assembled precursor film fabric is then precision slit and perforated in a desired manner so as to provide a pattern of slits and perforations coinciding with selected edges of each protrusion. The laser is focused so that it penetrates only through one film layer, and does not cut the second layer beneath (or above) it so that each film layer can be independently slit and perforated as needed. A desired length and width of the assembly is then constructed in the manner described above, and a seaming element bonded to each opposite end.

I claim:

1. A nonwoven industrial textile for conveying in an industrial process, the industrial textile comprising at least a first layer and a second layer of film, each layer having an upper surface and a lower surface, wherein
   (i) each layer comprises a plurality of protrusions separated by land areas and each defining an aperture extending from the upper surface to the lower surface, and
   (ii) for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
      (a) a detached free end; and
      (b) a weakened end portion integral with but constructed and arranged to be detachable from a contiguous land area in response to strain.

2. A nonwoven industrial textile according to claim 1, wherein each of the first layer and second layer comprises protrusions of the second set.

3. A nonwoven industrial textile according to claim 1, wherein each of the first layer and the second layer comprises protrusions of the first set having the same configuration on each layer.

4. A nonwoven industrial textile according to claim 1, wherein for each layer having protrusions of the second set, the protrusions of the second set comprise at least 25% of a total of the protrusions on that layer.

5. A nonwoven industrial textile according to claim 4, wherein for each layer having protrusions of the second set, a ratio of the number of protrusions of the second set to the number of protrusions of the first set is 1:3.

6. A nonwoven industrial textile according to claim 1, wherein each of the protrusions of the first set has a body comprising a top member having opposed first and second lateral edges and is supported by opposed compression resistant first and second end walls, at least one of the lateral edges cooperating with the end walls to define an aperture extending from the upper surface to the lower surface, each end wall having a base edge connected to an adjacent land area and having a configuration selected from at least one of
   (a) the base edge being convexly curved away from the protrusion body; and
   (b) each end wall extending below at least a part of each of the first and second lateral edges and being connected to each of the first and second lateral edges.

7. A nonwoven industrial textile according to claim 1, wherein the protrusions of the second set are secured to land areas on the opposing one of the first and second layer.

8. A nonwoven industrial textile according to claim 7, wherein the protrusions of the second set are welded to land areas on the opposing one of the first and second layer.

9. A nonwoven industrial textile according to claim 1, constructed of a thermoplastic polymer material, selected from polyethylene terephthalate (PET), polybutylene terephthalate (PBT), polyethylene naphthalate (PEN), polycyclohexane dimethanol terephtalate (PCTA), polypropylene (PP), a polyamide, a polyolefin, polyphenylene sulphide (PPS) and polyether ether ketone (PEEK).

10. A nonwoven industrial textile according to claim 9, wherein the material is bi-axially oriented and hydrolysis stabilized.

11. A nonwoven industrial textile according to claim 1, constructed of an oriented multi-layer polymer film comprising at least two thermoplastic polymeric layers, wherein at least one of the layers includes a radiation absorbent material to provide a weldable outer surface of the polymer material and at least one of the layers permits through transmission of laser energy.

12. A nonwoven industrial textile according to claim 1, further comprising a textile body having a first seamable end and a second seamable end, a first seaming element provided at the first seamable end and a second seaming element provided at the second seamable end, wherein the first and second seaming elements are constructed and arranged to be secured together to form a seam.

13. A nonwoven industrial textile according to claim 12, wherein each of the first and second seaming elements comprises at least a first layer and a second layer of film, each layer having an upper surface and a lower surface, wherein
  (i) each layer comprises a plurality of protrusions separated by land areas and each defining an aperture extending from the upper surface to the lower surface, and
  (ii) for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
    (a) a detached free end; and
    (b) a weakened end portion integral with but constructed and arranged to be detachable from a contiguous land area in response to strain.

14. A nonwoven industrial textile according to claim 12, wherein at least one of the first seaming element and the second seaming element is integrally constructed with the textile body at the respective seamable end.

15. A seaming element for a nonwoven industrial textile, the industrial textile being constructed and arranged according to claim 1, the seaming element comprising at least a first layer and a second layer of film, each layer having an upper surface and a lower surface, wherein
  (i) each layer comprises a plurality of protrusions separated by land areas and each defining an aperture extending from the upper surface to the lower surface, and
  (ii) for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
    (a) a detached free end; and
    (b) a weakened end portion integral with but constructed and arranged to be detachable from a contiguous land area in response to strain.

16. A method of making a nonwoven industrial textile for conveying in an industrial process, the method comprising the steps of
  (i) providing at least a first layer and a second layer of film, each layer having an upper surface and a lower surface;
  (ii) selectively embossing each of the first layer and second layer of the film to provide a plurality of protrusions separated by land areas and selectively cutting each protrusion to define an aperture extending below the protrusion from the upper surface to the lower surface of the film, wherein
    for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
    (A) a detached free end; and
    (B) a weakened end portion integral with but constructed and arranged to be detachable from a contiguous land area in response to strain; and
  (iii) securing the first layer to the second layer.

17. A method according to claim 16, wherein the selective embossing in step (B) comprises
  (b.1) selectively cutting each layer of the film to provide a plurality of slits extending from the upper surface through to the lower surface;
  (b.2) selectively applying pressure to selected portions of each layer to provide the plurality of protrusions separated by land areas; and
  (b.3) aligning selected protrusions of the first layer with land areas of the second layer, and aligning selected protrusions of the second layer with land areas of the first layer.

18. A method according to claim 16, wherein step (B) comprises
  (b.1) selectively applying pressure to selected portions of the film to form protruding embossed areas separated by land areas, creating a contoured profile in the upper surface; (b.2) selectively cutting and removing material from at least one of the sidewalls of at least some of the protruding embossed areas to define the plurality of protrusions; and
  (b.3) aligning selected protrusions of the first layer with land areas of the second layer, and aligning selected protrusions of the second layer with land areas of the first layer.

19. A method according to claim 16, wherein protrusions of the second set are provided to each of the first layer and second layer.

20. A method of making a nonwoven industrial textile for conveying in an industrial process, the method comprising the steps of
  (i) providing at least a first layer and a second layer of film, each layer having an upper surface and a lower surface;
  (ii) selectively embossing each of the first layer and second layer of the film to provide a plurality of protrusions separated by land areas wherein for at least one of the first layer and the second layer, the plurality of protrusions comprises a first set of protrusions having first and second ends integral with contiguous land areas and at least a second set of protrusions each comprising a first end integral with a contiguous land area and an opposing second end having a configuration selected from
(A) a detached free end; and
(B) a weakened end portion integral with but constructed and arranged to be detachable from a contiguous land area in response to strain;

(iii) aligning selected protrusions of the first layer with land areas of the second layer, and aligning selected protrusions of the second layer with land areas of the first layer, and securing the first layer to the second layer; and (iv) selectively cutting each protrusion to define an aperture extending below the protrusion from the upper surface to the lower surface of the respective layer.

\* \* \* \* \*